Patented Mar. 29, 1932

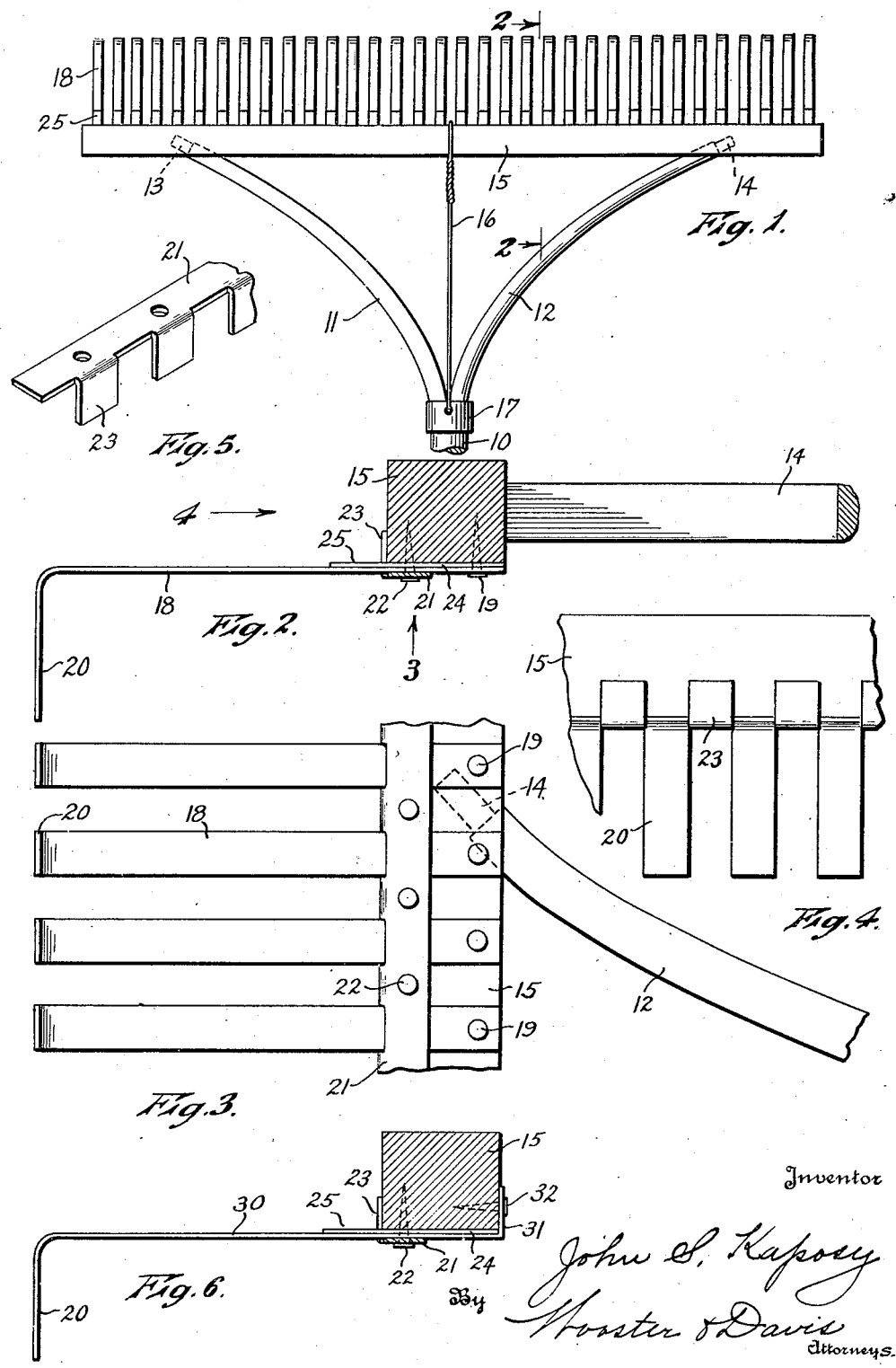

1,851,047

UNITED STATES PATENT OFFICE

JOHN S. KAPOSY, OF BRIDGEPORT, CONNECTICUT

RAKE

Application filed June 29, 1929. Serial No. 374,752.

This invention relates to an improved rake, and has for an object to provide an improved lawn or garden rake which will have spring teeth which will thoroughly remove lawn clippings, leaves and trash, even though the raked surface be very irregular without tearing or digging up and injuring the raked surface such as sod.

A further object of this invention is to provide an improved means of affixing the cross bar to the handle which will be simple of assembly yet hold it firmly.

It is another object of the invention to provide a rake construction which may be made very light in weight.

A still further object is to provide a rake having reenforced spring teeth which will yield so as to ride over irregularities of the raked surface without digging up the sod or loosening the leaves and trash, but will be very strong so that they can be used for a long time without breaking.

With the foregoing and other objects in view, the invention consists in certain novel features of construction, combinations and arrangements of parts as will be more fully described in connection with the accompanying drawings.

In the drawings,

Fig. 1 is a back plan view of a rake constituting an embodiment of this invention, the handle being broken away.

Fig. 2 is an enlarged cross section on line 2—2 of Fig. 1.

Fig. 3 is a fragmentary front plan view of the rake face looking in the direction of arrow 3 on Fig. 2.

Fig. 4 is a fragmentary end plan view looking in the direction of arrow 4 on Fig. 2.

Fig. 5 is a perspective view of one end of the spacing strap.

Fig. 6 is a view similar to Fig. 2 but shows a modified form.

There is shown at 10 the end of a rake handle of the usual length, the handle end being split into two portions 11 and 12 having reduced ends 13 and 14. The reduced ends 13 and 14 are held in place in appropriate recesses in a cross bar 15 by a twisted wire 16 connecting the cross bar to a ferrule 17 about handle 10, the ferrule also serving to prevent handle 10 from any tendency to accidently split.

Flat strips 18 of very thin spring metal are affixed to the cross bar 15 by means of tacks 19 passing through one end of the strips, their other ends being bent or hooked at right angles forming teeth 20. To hold the teeth in parallel relation to each other, as well as to reenforce them, a spacing strip 21 is affixed over the strip 18 to the cross bar 15 by tacks 22 passing therethrough between the strips 18 and has spacing fingers 23 passing between the strips 18 and bent at right angles about the cross bar 15. To further reenforce the individual teeth, a flat strip spring 24 of similar material to strips 18 is held between the strip 18 and the cross bar 15 and projects somewhat beyond the end of the cross bar as at 25. Of course, the dimensions may vary greatly but I have found it very satisfactory to make the teeth 18 of flat spring metal about one-thirty second of an inch thick and three-eighths of an inch wide with the spaces between the teeth of about the same width. The horizontal portion of the teeth was about four inches long and the upright portion about one and one-quarter inches, but it will, of course, be understood that this is merely an example and that the dimensions may be varied as found desirable.

In Fig. 6, there is shown a modified form having the same cross bar 15, spacing and securing strip 21 and reenforcing springs 24, but in this form the strips 30, corresponding to strip 18 and having teeth 20, have their other ends bent or hooked about the cross bar 15 as at 31 and are affixed thereto as by tacks 32.

In operation, the rake may be raked across a lawn, and teeth 20 will gather up the trash and leaves. Due to their thinness, resiliency and flat strip like form, they are very flexible, and will ride over any irregularities in the lawn surface, the reenforcing springs 24 preventing the teeth from flexing too far and reenforcing the same so as to prevent the teeth breaking. I have found this rake to be very effective in removing leaves and so forth without injury to the sod surface and also very easy to use as it is of very light weight and does not dig or catch into the surface of the sod. If leaves or trash are held between the teeth they may be easily and quickly removed by merely turning the rake over and drawing the back along the surface of the sod, which draws the leaves and trash out the free ends of the teeth.

From the foregoing description it will be apparent that there has been provided an improved rake having an improved means for attaching the cross bar to the handle and an improved set of teeth which is very economical to manufacture and assemble and which is very efficient in use.

Having thus set forth the nature of the invention, what is claimed is:

1. A rake comprising a handle, a cross bar affixed thereto, thin flat spring metal strips having one of their ends affixed to said cross bar, said strips being arranged in parallel relation to each other, the other ends of said strips being bent at an angle to form rake teeth, means for reenforcing said strips on said cross bar comprising a spacing strip passing over a plurality of the teeth, spaced fingers on said spacing strip bent at an angle thereto about the cross bar and passing between said teeth strips, affixing means passing through said spacing strip to the cross bar, short flat reenforcing springs held between the teeth strips and the cross bar and extending parallel to the teeth strips beyond the cross bar.

2. A rake comprising a handle, a cross bar affixed thereto, thin flat spring metal strips having one of their ends affixed to said cross bar, said strips being arranged in parallel relation to each other, the other ends of said strips being bent at an angle to form rake teeth, the affixed ends of the teeth strips being bent at an angle about the cross bar, means for reenforcing said strips on said cross bar comprising a spacing strip, spaced fingers on said spacing strip bent at an angle thereto about the cross bar and passing between said teeth strips, affixing means passing through said spacing strip to the cross bar, short flat reenforcing springs held between the teeth strips and the cross bar and extending parallel to the teeth strips beyond the cross bar.

3. A rake comprising a cross bar, thin flat spring metal strips having one of their ends affixed to said cross bar, said strips being arranged in parallel relation to each other, the other ends of said strips being bent at right angles to form rake teeth, means for reenforcing said strips on said cross bar comprising a spacing strip, spaced fingers on said spacing strip bent at right angles thereto about the cross bar and passing between said teeth strips, and affixing means securing said spacing strip to the cross bar.

4. A rake comprising a cross bar, thin flat spring metal strips having one of their ends affixed to said cross bar, said strips being arranged in parallel relation to each other, the other ends of said strips being bent at an angle to form rake teeth, the affixed ends of the teeth strips being bent about the cross bar, means for reenforcing said strips on said cross bar comprising a spacing strip, spaced fingers on said spacing strip bent at right angles thereto about the cross bar and passing between said teeth strips, and affixing means securing said spacing strip to the cross bar.

In testimony whereof I affix my signature.

JOHN S. KAPOSY.